United States Patent
Brewster et al.

(10) Patent No.: US 9,294,149 B2
(45) Date of Patent: Mar. 22, 2016

(54) INTEGRATED CONTACTLESS CONNECTIVITY PLATFORM FOR PORTABLE ELECTRONIC DEVICES

(71) Applicant: BrewsterPearah Ventures LLC, Winnetka, IL (US)

(72) Inventors: Philip Brewster, Winnetka, IL (US); David Pearah, Oak Park, IL (US)

(73) Assignee: BREWSTERPEARAH VENTURES LLC, Winnetka, IL (US)

( * ) Notice: Subject to any disclaimer, the term of this patent is extended or adjusted under 35 U.S.C. 154(b) by 451 days.

(21) Appl. No.: 13/831,046

(22) Filed: Mar. 14, 2013

(65) Prior Publication Data

US 2013/0300935 A1 Nov. 14, 2013

Related U.S. Application Data

(60) Provisional application No. 61/646,869, filed on May 14, 2012.

(51) Int. Cl.
| | |
|---|---|
| *H04B 5/00* | (2006.01) |
| *H04N 5/00* | (2011.01) |
| *H04N 21/222* | (2011.01) |
| *H04N 21/443* | (2011.01) |

(52) U.S. Cl.
CPC ............ *H04B 5/0025* (2013.01); *H04B 5/0031* (2013.01); *H04B 5/0037* (2013.01); *H04N 5/00* (2013.01); *H04N 21/2223* (2013.01); *H04N 21/4436* (2013.01)

(58) Field of Classification Search
None
See application file for complete search history.

(56) References Cited

U.S. PATENT DOCUMENTS

| | | |
|---|---|---|
| 2009/0075704 A1 | 3/2009 | Wang |
| 2010/0219698 A1 | 9/2010 | Azancot et al. |
| 2012/0007555 A1 | 1/2012 | Bukow |
| 2012/0026724 A1* | 2/2012 | Metcalf et al. ................ 362/127 |
| 2012/0047538 A1* | 2/2012 | Murase et al. .................. 725/81 |

FOREIGN PATENT DOCUMENTS

KR 10-2012-0085498 A 8/2012

OTHER PUBLICATIONS

International Search Report and Written Opinion for International Application No. PCT/US2013/064079, issued Jan. 16, 2014, Applicant, BrewsterPearah Ventures LLC (8 pages).

* cited by examiner

*Primary Examiner* — Jared Fureman
*Assistant Examiner* — Aqeel Bukhari
(74) *Attorney, Agent, or Firm* — Richards Patent Law P.C.

(57) ABSTRACT

A system for delivering wireless electric power and associated system services to portable electronic devices includes: (i) a plurality of links including one or more wireless transmitters/receivers adapted to transmit electric power and to transmit and receive audiovisual data, wherein the plurality of links are adapted to interconnect in series; (ii) a master control unit including a controller adapted to control the delivery of electric power through the interconnected links and control the delivery of selected audiovisual data from the links to a central audiovisual adaptor; (iii) one or more wireless audiovisual adaptors, each wireless audiovisual adaptor including an adaptor for connecting to an audiovisual port of a portable electronic device and a transmitter/receiver adapted to wirelessly transmit audiovisual data to the links; (iv) and one or more wireless electric power adaptors, each wireless electric power adaptor including an adaptor for connecting to an electric power input port of a portable electronic device and a receiver adapted to wirelessly receive electric power.

20 Claims, 6 Drawing Sheets

INTEGRATED CONTACTLESS CONNECTIVITY PLATFORM FOR PORTABLE ELECTRONIC DEVICES

CROSS-REFERENCE TO RELATED APPLICATIONS

This application claims the benefit of U.S. Provisional Application No. 61/646,869, filed on May 14, 2012, the entirety of which is incorporated herein by reference.

BACKGROUND OF THE INVENTION

The present subject matter relates generally to an integrated hardware and software platform adapted to permit a plurality of portable electronic devices to connect to (i) audiovisual display devices, (ii) an electric power supply, and (iii) the Internet on an ad hoc and scalable basis without physical contact or connection to the platform. The term portable electronic device is intended to broadly encompass any personal computing device, including, without limitation, laptops, tablets and smartphones.

There are numerous situations in which it would be beneficial to provide a plurality of portable electronic devices (i) connectivity to audiovisual display devices, (ii) an electric power supply, and (iii) Internet connectivity on an ad hoc and scalable basis without physical contact or connection to the platform. For example, in the office setting, participants in meetings must physically connect to the audiovisual display device(s) and provide an individual electric power source resulting in a tangle of wires and a scarcity of available electric power outlets. Also, for example, in response to natural disasters, emergency response teams, disaster relief teams, and journalists often set up ad hoc command/communication centers to manage operations. Similarly, military units encounter situations in which a temporary location, such as a forward operating base, may be established to manage operations. In these scenarios, being able to support portable electronic devices on an ad hoc and scalable basis, particularly providing (i) connectivity to audiovisual display devices, (ii) an electric power supply, and (iii) Internet connectivity without physical contact or connection to the platform would be exceptionally beneficial.

Knowing there is a location where a user (e.g., office workers, computer programmers, emergency response personnel, military personnel, etc.) may connect to (i) audiovisual display devices, (ii) an electric power supply and (iii) the Internet without physical contact or connection to the platform would enable the user to avoid carrying additional batteries, wires and electric power sources for their portable electronic devices, saving space and weight, which can be critically important in certain circumstances.

Additionally, being able to connect to (i) audiovisual display devices, (ii) an electric power supply, and (iii) the Internet through a platform that uses a broad range of adaptors to provide the contactless connection to the platform would enable users with various makes and models of portable electronic devices to make use of this single, universal platform. This is particularly important if users are not all from a single organization or are responsible for providing their own portable electronic devices.

In addition, providing a scalable platform would be highly beneficial. For example, on one end of the spectrum, some circumstances may call for the support of a minimal number of portable electronic devices. On the other end of the spectrum, the situation may call for the support of numerous devices. A scalable platform would enable the solution to be appropriately sized for a given situation, making the most efficient use of the platform resources.

In addition, providing an ad hoc platform would be highly beneficial. For example, some circumstances may call for the support of portable electronic devices without advance knowledge of how many users are to be supported and without advance knowledge of the precise placement of these devices relative to the platform. An ad hoc platform would enable the solution to adjust to dynamic user demands in real-time without advance knowledge of the number of portable electronic devices to be supported or the precise location, thereby permitting improvised and makeshift meetings.

Accordingly, there is a need for an integrated hardware and software platform capable of providing a plurality of portable electronic devices: (i) audiovisual display device connectivity (ii) an electric power supply, and (iii) Internet connectivity on an ad hoc and scalable basis without physical contact or connection to such platform as described and claimed herein.

BRIEF SUMMARY OF THE INVENTION

The present disclosure provides an integrated hardware and software platform that facilitates and manages the delivery of: (i) audiovisual display device connectivity; (ii) electric power sufficient to operate and/or charge such portable electronic devices; and (iii) Internet protocol networking connectivity to multiple portable electronic devices within proximate range of the individual links without physical contact or physical connection to any link specifically or the platform generally.

In the description provided herein, a distinction is made between the terms "the platform" and "the system." As used herein, "the platform" refers to the group of elements that provide the services and communicate wirelessly to the wireless adaptors. By contrast, "the system" refers to the entire scope of the disclosed subject matter, including the platform and the wireless adaptors with which the platform communicates.

In a preferred embodiment, the platform includes: a master control unit connected by wire to a cable terminal that, in turn, is connected by wire to a sequenced chain of multiple individual, semi-articulable independent segments known as links. The system further includes one or more audiovisual adaptors plugged into, integrated within, or otherwise physically connected to each portable electronic device. The audiovisual adaptors facilitate the delivery of audiovisual supply signals from the portable electronic devices to audiovisual display devices connected to the platform without physical contact or physical connection by the portable electronic devices to any link or the platform. Electric power adaptors plug into, integrate within, or otherwise physically connect to each portable electronic device. The electric power adaptors facilitate the delivery of electric power to portable electronic devices from electric power sources connected to the platform without physical contact or physical connection by the portable electronic devices to any link or the platform. The platform facilitates the delivery of Internet protocol networking connectivity to portable electronic devices within proximate range of the platform by means of a standard wireless Internet router in the master control unit. By way of clarification, the platform and system, including any audiovisual adaptor or electric power adaptor, does not require any surface contact or physical connection between any portable electronic device and the platform for the system to provide any and all services (except the connection between the individual audiovisual adaptor and electric power adaptor at the level of the portable electronic device).

In one example, the master control unit is a box-shaped housing with one or more standard electric plugs and wires providing electric power to the master control unit that, in turn, facilitates the delivery of connected services to the portable electronic devices. Externally, the preferred embodiment of the master control unit includes: (i) at least one standard 8P8C port (such as a Gigabit RJ45 Ethernet connection port); and (ii) at least one universal serial bus port (such as a USB 2.0 port), collectively referred to herein as the ports. The master control unit may further include an external power switch to power on and off the master control unit. Additionally, the master control unit may include external lights and interactive displays indicating the number of portable electronic devices connected to the platform and to provide real-time information related to the delivery of services to the portable electronic devices, including various user system notifications.

Internally, the preferred embodiment of the master control unit includes one or more circuit boards (to which the ports may be connected) which house: (i) one or more central processing unit(s) and (ii) memory storage. The internal components collectively run software to manage the master control unit in facilitating and delivering services to portable electronic devices. The master control unit further includes a wireless Internet router that manages, facilitates and delivers Internet protocol networking to the portable electronic devices within proximate range of the platform. The master control unit further is capable of internally scaling its capabilities, through the addition of hardware and software, to increase the demand capacity of audiovisual, electric power and Internet protocol networking services as circumstances may require.

In one example, the cable terminal is a circular housing with a port that accepts a master control wire (as generally described below) from the master control unit. The master control wire facilitates the delivery of electric power from the master control unit to the cable terminal. Additionally, the master control wire facilitates the delivery of bi-directional control signals between the master control unit and the cable terminal. In the preferred embodiment, three wires extend from the cable terminal: (i) a wire with a male connector that terminates on a link; (ii) a wire with a female connector that terminates on a link; and (iii) a wire with multiple video adaptors, including, for example, VGA (RBG), HDMI, DVI and Display ports. The cable terminal may be weighted and/or have tactile surface beneath to: (i) anchor the cable terminal on the working surface; (ii) aid in positioning the wire extending from the master control unit to the working surface; and (iii) prevent tension and movement of the links by the wire extending from the master control unit.

In one example, each link is embodied in an individual rectangular shaped housing that internally houses one or more wires extending the length of the link. The wires transmit the services through each link. One or more transmitters are connected to the wires to transmit the services to any portable electronic devices within proximate range of the link. In the preferred embodiment, each link has a male joint and a female joint at opposing ends. Each male and female joint has multiple prongs or receptors, respectively, to interconnect and to form a physical connection between adjacent links, including by means of magnetic inductive coupling. Further, in the preferred embodiment, each male and female joint is capable of minimally connecting at three positions. After connection, the male and female joints connect the one or more wires from a first link to the one or more wires of the next link, which results in a sequenced chain of multiple individual, semi-articulable links.

In one example, the electric power adaptor consists of one or more adaptors that physically plugs into, or otherwise physically connects to, the respective electric power port of a portable electronic device. The electric power adaptor facilitates delivery of electric power to portable electronic devices without physical contact or physical connection by such portable electronic device to any link or any other element of the platform. In a preferred embodiment, the electric power adaptor has an LED indicator that displays, for example, connection status, among other information.

In one example, the audiovisual adaptor consists of one or more universal adaptors that physically plugs into or otherwise physically connects to the respective video ports (e.g., VGA (RBG) port(s), HDMI port(s), DVI port(s), Display port, etc.) of the portable electronic device or devices. The audiovisual adaptor facilitates the output of audiovisual signals from the portable electronic devices to the platform through receivers in the links. In a preferred embodiment, the audiovisual adaptor includes one or more physical or electronic button(s) that permit the portable electronic device to control (and release control of) audiovisual display devices wirelessly connected to the platform.

It is contemplated that the elements of the system may be optimally provided in various forms and configurations to best meet the particular circumstance of use. For example, it is contemplated that the solution provided herein may be particularly well adapted to support the demands of the various environments required to support military, homeland security, and police functions. In such cases, providing a ruggedized, moisture resistant, hermetically sealed, vibration resistant, and thermally resistant system may be particularly beneficial.

As noted above, the system facilitates the delivery of services to the portable electronic devices without physical contact or physical connection by such device to any link or other element of the platform. The system manages and facilitates the following general functions: (i) the connection (and disconnection) of electronic portable devices on to and off of the platform; (ii) the delivery of electric power to electronic portable devices and management thereof; and (iii) the facilitation of audiovisual supply signals from the electronic portable devices to the platform, all without physical contact or physical connection by any electronic portable devices to any link or to any other element of the platform. Additionally, the system facilitates the delivery of Internet connectivity to the electronic portable devices within proximate range of the platform by means of a standard wireless Internet router in the master control unit.

The system, controlled by the master control unit, manages the wire-free connection (and disconnection) of portable electronic devices on to and off of the platform. The master control unit detects when unconnected portable electronic devices enter range of a supported link and when portable electronic devices connect to and/or disconnect from a supported link. In preferred embodiments, the master control unit calculates on regular intervals the number of portable electronic devices wirelessly connected to the system through the links and may further govern the maximum number of portable electronic devices permitted to connect to the platform through the links at any given time. The master control unit, by means of software, also controls which specific link a given portable electronic device may connect to when the portable electronic device is in proximate range of, and is capable of connecting to, more than one link.

The system, controlled by the master control unit, facilitates the delivery of electric power through the master control unit to the links, and thereafter such links distribute electric power to connected portable electronic devices within proximate range of the links. The system automatically manages the supply of electric power to ensure that the supply of electric power is sufficient to power the connected portable electronic devices. The system may automatically enable and/or disable a connected wireless electric power adaptor and/or link, through the master control unit, in response to electric power demands of the system and portable electronic devices connected thereto. The master control unit is capable of internally scaling its capabilities, through the addition of hardware and software, to increase the demand capacity of electric power services as circumstance(s) may require.

The system, controlled by the master control unit, facilitates the delivery of multiple sources of audiovisual signals to an audiovisual display device from portable electronic devices wirelessly connected to the platform through the links. In a preferred embodiment, the master control unit automatically detects when an audiovisual display device is connected to the system. The master control unit automatically determines which electronic personal devices connected to the platform through the link(s) are able to transmit audiovisual supply signals to the audiovisual display device and, consequently, which electronic personal device is currently the active source of such audiovisual supply signals. The platform receives requests from connected electronic personal devices to assume control (and terminate control) of the audiovisual display device. The system manages and permits such requesting electronic personal device to assume such control of the audiovisual display device and other portable electronic devices to request the same control. The master control unit is capable of internally scaling its capabilities, through the addition of hardware and software, to increase the demand capacity of audiovisual display services as circumstance(s) may require.

In one embodiment, a system for delivering wireless electric power and associated system services to portable electronic devices includes: a plurality of links, each link including (i) one or more transmitters adapted to wirelessly transmit electric power and one or more transmitters/receivers adapted to wirelessly transmit and receive audiovisual data and associated system control data, wherein the plurality of links are adapted to interconnect in a series such that electric power and audiovisual data and associated system control data are transmitted between connected links; (ii) a master control unit, including a controller adapted to control the delivery of electric power through the interconnected links to portable electronic devices and control the delivery of selected audiovisual data from the links to a central audiovisual device; (iii) one or more wireless audiovisual adaptors, each wireless audiovisual adaptor including an adaptor for connecting to an audiovisual port of a portable electronic device and a transmitter/receiver adapted to wirelessly transmit audiovisual data and associated system control data to the links; (iv) and one or more wireless electric power adaptors, each wireless electric power adaptor including an adaptor for connecting to an electric power input port of a portable electronic device and a receiver adapted to wirelessly receive electric power.

The system may be automatically expanded or contracted by adding or removing links to or from the system, and the master control unit controls the expansion and contraction of the system by automatically coordinating the addition and subtraction of portable electronic devices to or from the system in real-time.

In some examples, the master control unit further includes a wireless Internet router, a standard 8P8C port, a serial bus port and a display providing real-time information regarding the connection of portable electronic devices to the master control unit.

In some versions of the system, the master control unit connects to the links through a cable terminal. The cable terminal may include the central audiovisual adaptor and at least two wired connectors for connecting the plurality of links to the master control unit.

The links may be configured to interconnect in at least three different orientations. For example, the connection between two interconnected links may pivot through a range of orientations, including by means of magnetic inductive coupling. Additionally, or alternatively, the connection between two interconnected links may be made at a plurality of locations on the link.

The wireless audiovisual adaptors may include a button to initiate and release control of audiovisual data communication to the central audiovisual adaptor and a connection status display, for example an LED status display. Similarly, the wireless electric power adaptors may include a connection status display, for example an LED status display.

Another example of the system for wirelessly delivering electric power to a plurality of portable electronic devices and controlling the delivery of audiovisual data to a central audiovisual device includes: a master control unit that provides electric power to a series of interconnected links that transmit electric power wirelessly to wireless electric power adaptors associated with portable electronic devices and wirelessly control the transmission of audiovisual data to the central audiovisual adaptor from one of the portable electronic devices through wireless audiovisual adaptors. The series of interconnected links may be automatically expanded by connecting one or more additional links to the series of interconnected links and one or more additional portable electronic devices may be automatically connected to the master control unit in real-time. The master control unit may further include a wireless Internet router.

An advantage of the systems and methods provided herein is that users are enabled to connect to (i) audiovisual display devices, (ii) an electric power supply, and (iii) the Internet without physical contact or connection to the platform.

Another advantage of the systems and methods provided herein is that they enable users to avoid carrying additional batteries, wires, and electric power supply adaptors for their portable electronic devices, saving space and weight.

A further advantage of the systems and methods provided herein is that they provide a universal platform through which portable electronic devices of various makes and models may wirelessly connect.

Yet another advantage of the systems and methods provided herein is that they may provide a modular scalable solution well adapted to meet the needs of any number of users.

Another advantage of the systems and methods provided herein is that they may be self-coordinating such that they allow for the ad hoc expansion/contraction of the system by allowing portable electronic devices to join and/or leave the system in real-time.

Another advantage of the systems and methods provided herein is that they allow the addition or removal of links from the platform in real-time operation permitting the ad hoc expansion/contraction of the system based upon the then-current demand of portable electronic devices.

Another advantage of the systems and methods provided herein is that they permit the master control unit to internally scale its capabilities, through the addition of hardware and software, to increase the demand capacity of audiovisual display and electric power services as circumstance(s) may require.

Still another advantage of the systems and methods provided herein is that they may provide a ruggedized platform that is suitable for use in harsh conditions.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 1b is a top view of the system shown in FIG. 1a.

FIG. 2b is a back view of the master control unit shown in FIG. 2a.

FIG. 2c is a front view of the master control unit shown in FIG. 2a.

FIG. 2d is an internal schematic of the master control unit shown in FIG. 2a

FIG. 3b is a schematic view of the cable terminal shown in FIG. 3a.

FIG. 4b is a bottom view of the link shown in FIG. 4a.

FIG. 4c is a side view of the link shown in FIG. 4a.

DETAILED DESCRIPTION OF THE INVENTION

Figure 1A:
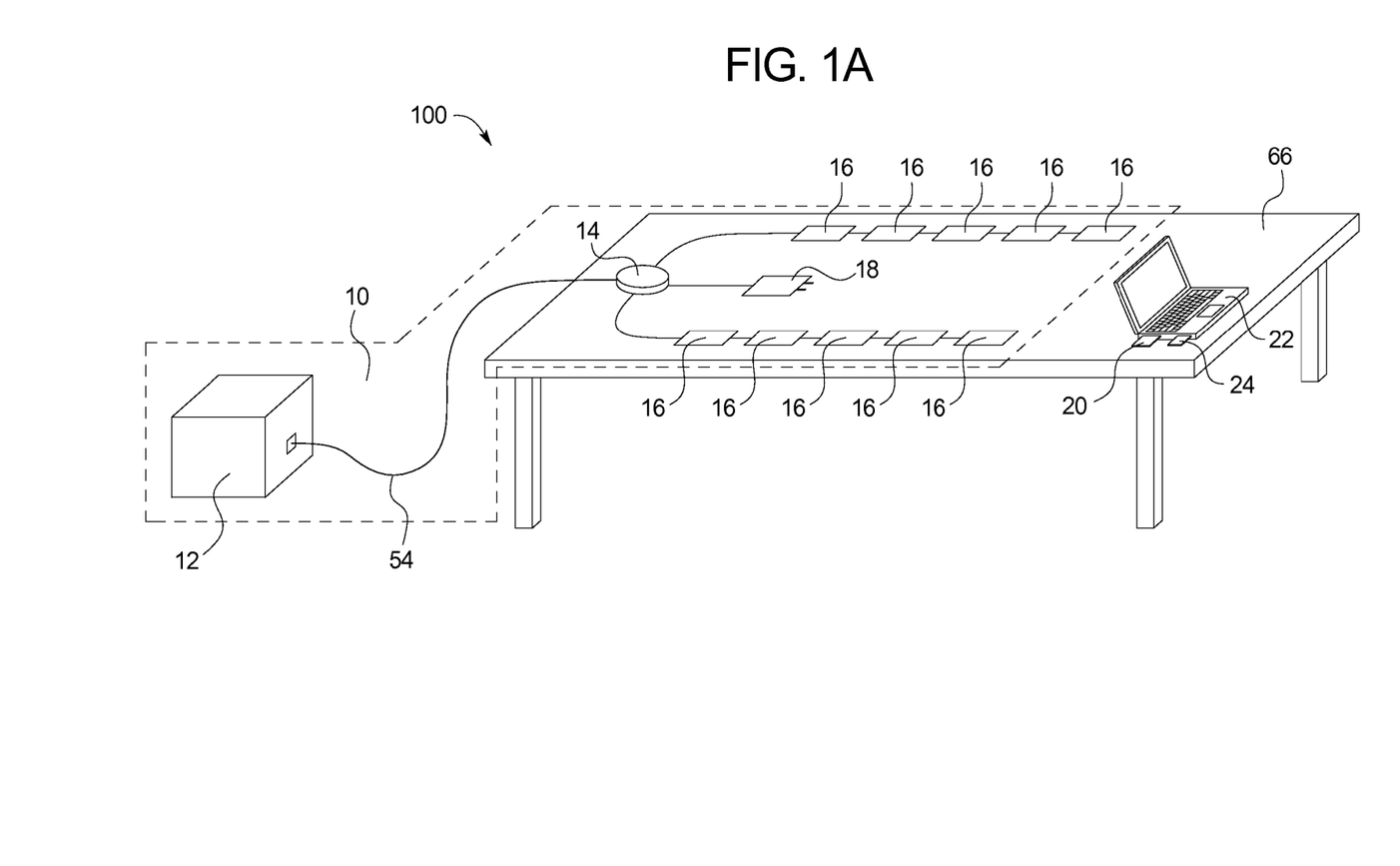
FIG. 1a is a perspective view of a system according to the present invention.
Figure 1B:
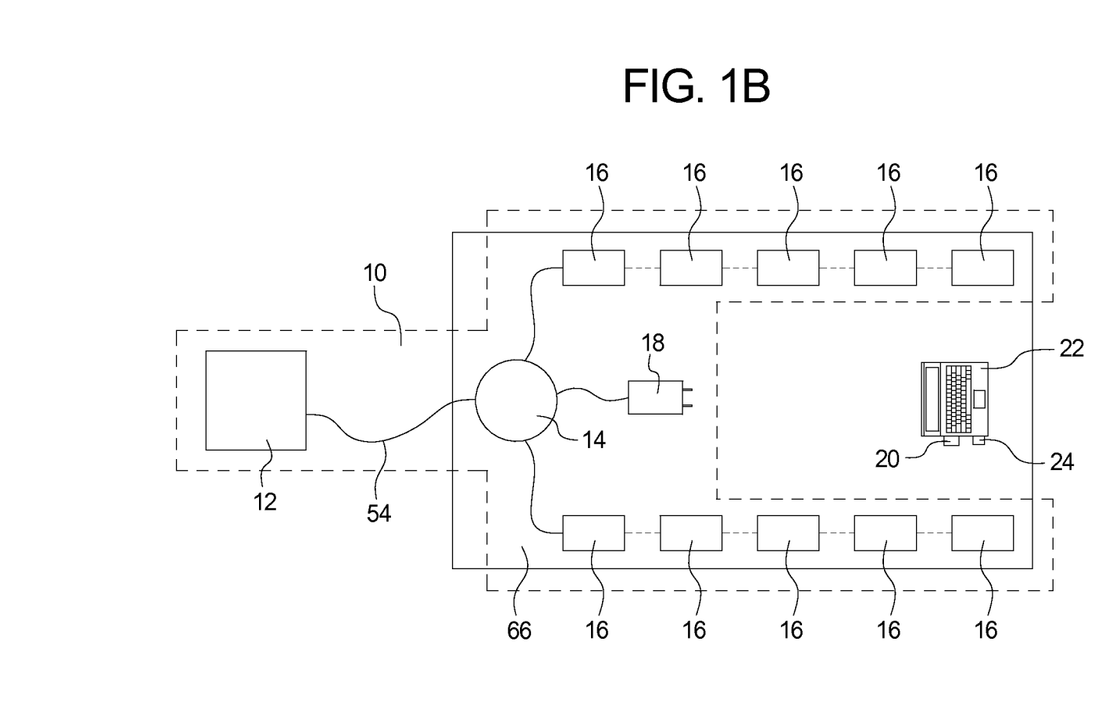

FIGS. 1a and 1b illustrate an example of an integrated contactless connectivity system for portable electronic devices 100, referred to herein as the system 100. As shown in FIGS. 1a and 1b, the system 100 includes: a master control unit 12, a cable terminal 14, a plurality of individual, semi-articulable, independent links 16, and a central audiovisual adaptor 18 (the central audiovisual adaptor 18). These elements of the system 100 are referred to herein collectively as the platform 10. The system 100 further includes one or more wireless audiovisual adaptors 20 (wireless audiovisual adaptors 20) for connecting portable electronic devices 22 to the platform 10 and one or more wireless electric power adaptors 24 for providing electric power from the platform 10 to the portable electronic devices 22.

The system 100 facilitates and manages the delivery of: (i) audiovisual display device connectivity from the portable electronic devices 22 to the audiovisual adaptor 18; (ii) electric power sufficient to operate and/or charge portable electronic devices 22; and (iii) Internet protocol networking connectivity to multiple portable electronic devices 22 within proximate range of the individual links 16 without physical contact or physical connection to any link 16 specifically, or the platform 10 generally.

Turning to FIG. 2a-2d, in one example, the master control unit 12 is a box shaped housing 26 with one or more standard electric plugs 28 and wires 30 providing electric power to the master control unit 12 that, in turn, facilitates the delivery of connected services to the portable electronic devices 22 through the master control wire 54 to the cable terminal 14. Externally, the preferred embodiment of the master control unit 12 includes: (i) at least one standard 8P8C port 32 (such as a Gigabit RJ45 Ethernet connection port); and (ii) at least one universal serial bus port 34 (such as a USB 2.0 port), collectively referred to herein as the ports 32 and 34. The master control unit 12 may further include an external power switch 36 to power on and off the master control unit 12. Additionally, the master control unit 12 may include external lights 38 and/or interactive displays 40 indicating the number of portable electronic devices 22 wirelessly connected to the platform 10 and to provide real-time information related to the delivery of services to the portable electronic devices 22.

Figure 2A:
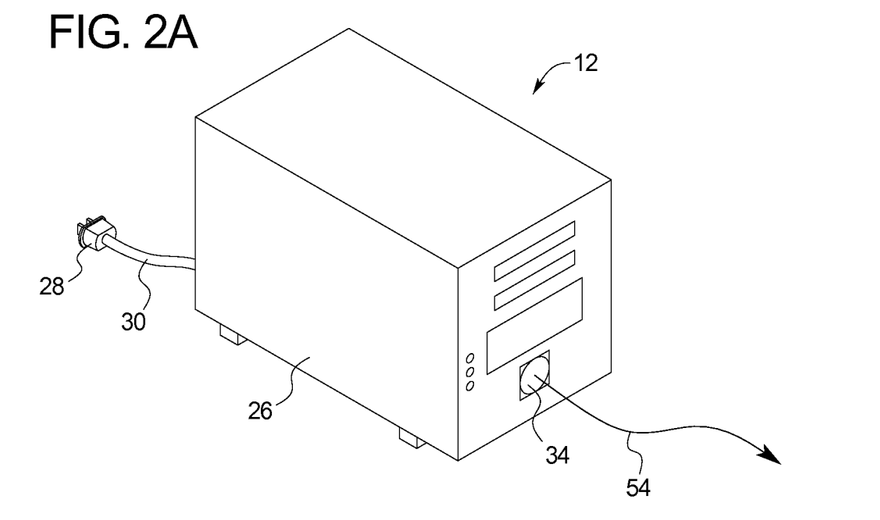
FIG. 2a is a perspective view of a master control unit from the system shown in FIGS. 1a-1b.
Figure 2B:
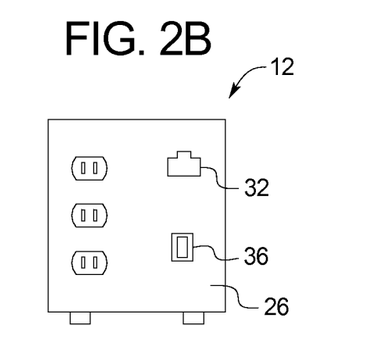
Figure 2C:
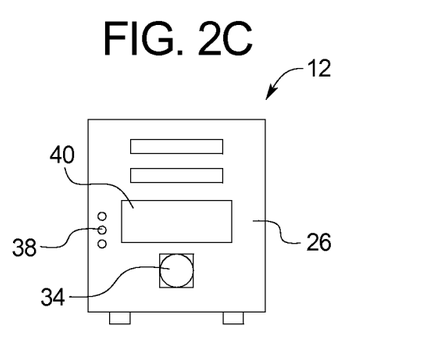
Figure 2D:
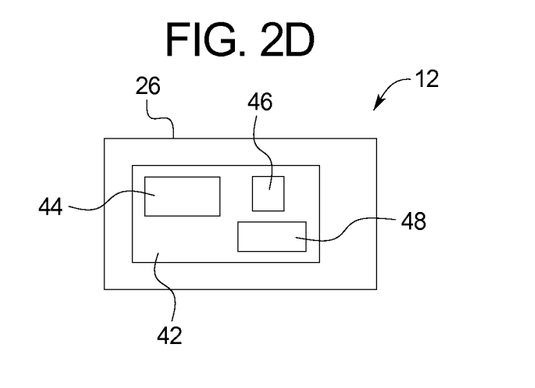

As shown in FIG. 2d, internally, the preferred embodiment of the master control unit 12 includes one or more circuit boards 42 (to which the ports 32 and 34 may be connected) which house: (i) one or more controllers 44 and (ii) memory 46. The internal components collectively run software to manage the master control unit 12 in facilitating and delivering services to portable electronic devices 22. In some embodiments, the master control unit 12 further includes a wireless Internet router 48 that manages, facilitates and delivers Internet protocol networking to the portable electronic devices 22 within proximate range of the platform 10. However, it is contemplated that the master control unit 12 may alternatively be provided without a wireless Internet router 48 or similar service.

Figure 3A:
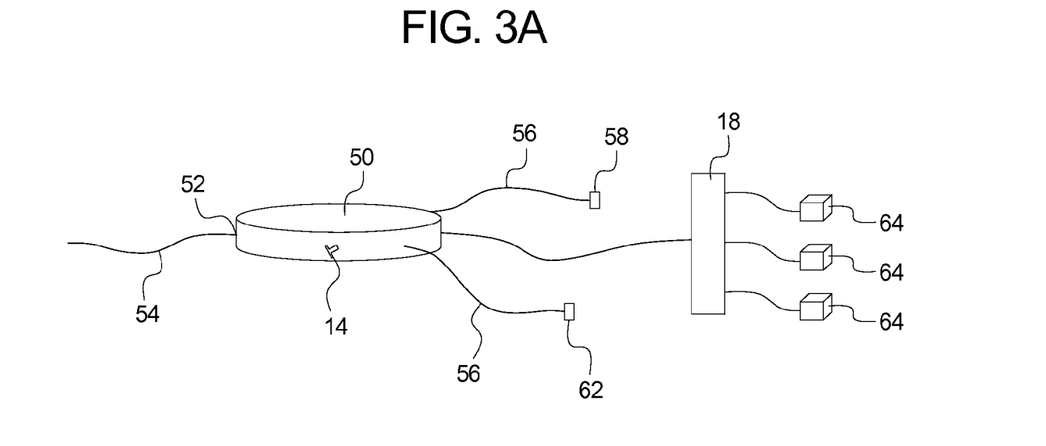
FIG. 3a is a perspective view of a cable terminal from the system shown in FIGS. 1a and 1b.
Figure 3B:
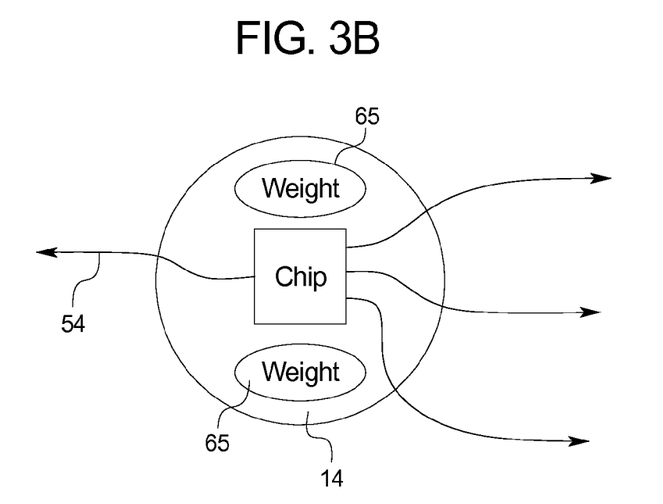

Turning now to FIGS. 3a-3b, in the example shown, the cable terminal 14 is provided in a circular housing 50 with a port 52 that accepts a master control wire 54 from the master control unit 12. The master control wire 54 facilitates the delivery of electric power from the master control unit 12 to the cable terminal 14. Additionally, the master control wire 54 facilitates the delivery of bi-directional control signals between the master control unit 12 and the cable terminal 14. In the preferred embodiment, three wires extend from the cable terminal 14: (i) a first wire 56 with a male connector 58 that terminates on a link 16; (ii) a second wire 56 with a female connector 62 that terminates on a link 16; and (iii) the central audiovisual adaptor 18. In one example, the central audiovisual adaptor 18 includes multiple video adaptors 64 including VGA (RBG), HDMI, DVI and Display ports. It is contemplated that the central audiovisual adaptor 18 may be wired or wireless.

The cable terminal 14 may be weighted, for example with a pair of internal weights 65 to: (i) anchor the cable terminal 14 on the working surface 66 (see FIG. 1); (ii) aid in positioning the master control wire 54; and (iii) to prevent tension and movement of the links 16 by the first wire 54 and the second wire 56.

While the preferred embodiment describes the cable terminal 14 as a separate element from the master control unit 12, it is contemplated that in certain embodiments of the system 100, the two elements may be found in a single housing or that the elements may be split amongst a greater number of housings.

Turning now to FIGS. 4a-4e, in the example shown, each link 16 is embodied in an individual rectangular shaped housing 68 that internally houses one or more wires 70 extending the length of the link 16. The wires 70 transmit the services through each link 16. One or more transmitters/receivers 72 are connected to the wires 70 to transmit the services to and from any portable electronic devices 22 within proximate range of the link 16. The transmitters/receivers 72 may be transceivers, transmitter-receivers, separate discreet transmitters and receivers, etc. In the preferred embodiment, the wires 70 communicate audiovisual data and electric power between the master control unit 12 and the transmitters/receivers 72, which in turn transmit/receive the audiovisual data and electric power to/from the one or more wireless audiovisual adaptors 20 and wireless electric power adaptors 24. The wireless communication/transmission between the links 16 and the wireless audiovisual adaptors 20 and wireless electric power adaptors 24 enables the platform 10 to wirelessly interact with the portable electronic devices 22.

Figure 4A:
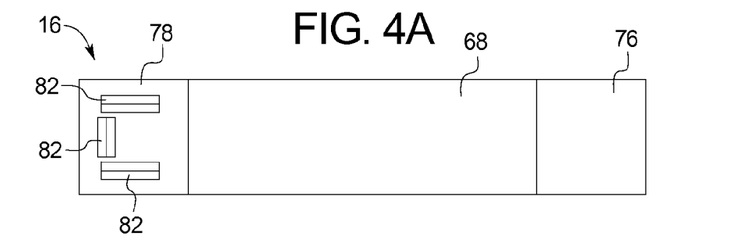
FIG. 4a is a top view of a link from the system shown in FIGS. 1a-1b.
Figure 4B:
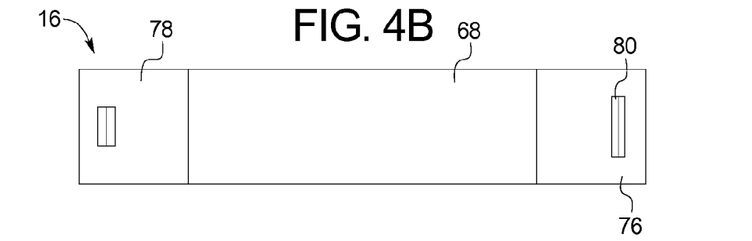
Figure 4C:
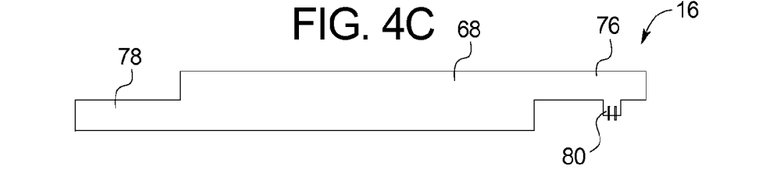
Figure 4D:
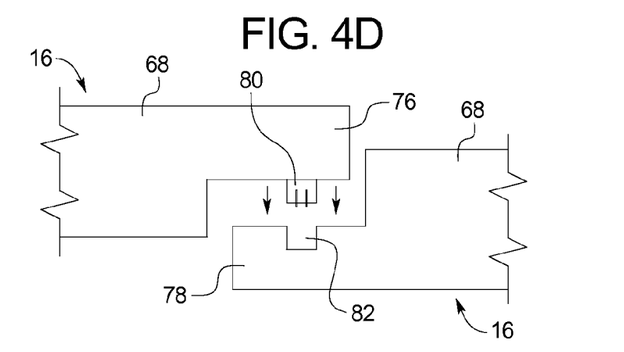
FIG. 4d is a close up view of the mating of a pair of links, such as those shown in FIGS. 4a-4c.
Figure 4E:
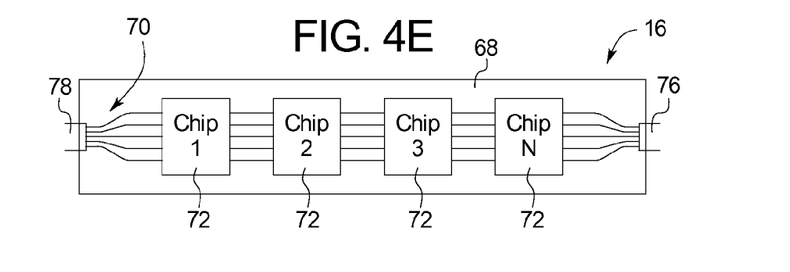
FIG. 4e is a schematic view of an example of the link shown in FIGS. 4a-4c.

In the preferred embodiment, each link 16 has a male joint 76 and a female joint 78 at opposing ends. Each male joint 76 and female joint 78 includes multiple prongs 80 or receptors 82, respectively, to interconnect and to form a physical connection between adjacent links 16, as shown in FIG. 4d. Further, in the preferred embodiment, each male joint 76 and female joint 78 is capable of minimally connecting at three positions. In the example shown in FIG. 4a, the female joint 78 includes three receptors 82 positioned at rights angles with each other. After connection, the male joint 76 and female joint 78 connect the one or more wires 72 from a first link 16 to the one or more wires 72 of the next link 16, which results in a sequenced chain of individual, semi-articulable links 16. Of course it is contemplated that various embodiments of the system 100 may include links 16 of varied size, shape, configuration, etc. For example, the links 16 may incorporate varied connection mechanisms, including incorporating a greater or lesser number of male joints 76, female joints 78, prongs 80, and/or receptors 82, or by means of magnetic inductive coupling. For example, the connection between interconnected links 16 may pivot such that the successive links 16 may be oriented in various orientations with respect to each other.

Figure 5:
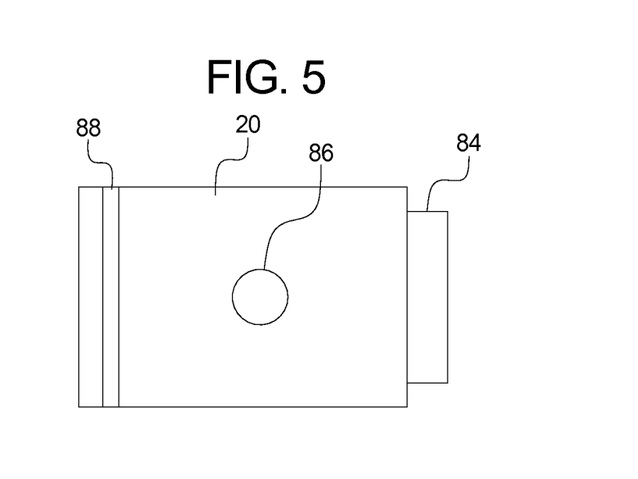
FIG. 5 is a perspective view of an example of a wireless audiovisual adaptor from the system shown in FIGS. 1a-1b.

Turning now to FIG. 5, the wireless audiovisual adaptors 20 may be plugged into, incorporated into, or otherwise physically connected to each portable electronic device 22 to facilitate the delivery of audiovisual supply signals from the portable electronic devices 22 to any audiovisual display devices connected to the central audiovisual adaptor 18 without physical contact or physical connection by such devices 22 to any link 16 or other element of the platform 10.

In one example, a wireless audiovisual adaptor 20 includes of one or more universal adaptors 84 that physically plug into or otherwise physically connect to the respective video port(s) (e.g., VGA (RBG) port(s), HDMI port(s), DVI port(s), Display port(s), etc.) of the portable electronic device 22. The wireless audiovisual adaptor 20 facilitates the output of audiovisual signals from the portable electronic devices 22 to the platform 10 through the transmitters/receivers 72 in the links 16. In a preferred embodiment, the wireless audiovisual adaptor 20 includes one or more physical or electronic button(s) 86 that permit the portable electronic device 22 to control (and release control of) audiovisual display devices connected to the platform 10 through the central audiovisual adaptor 18. In a preferred embodiment, the wireless audiovisual adaptor 20 includes an LED indicator 88 that displays, for example, connection status, among other information.

Figure 6A:
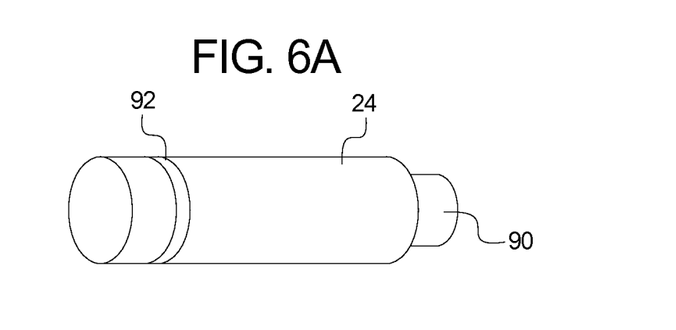
FIG. 6a is a perspective view of an electric power adaptor from the system shown in FIG. 1.
Figure 6B:
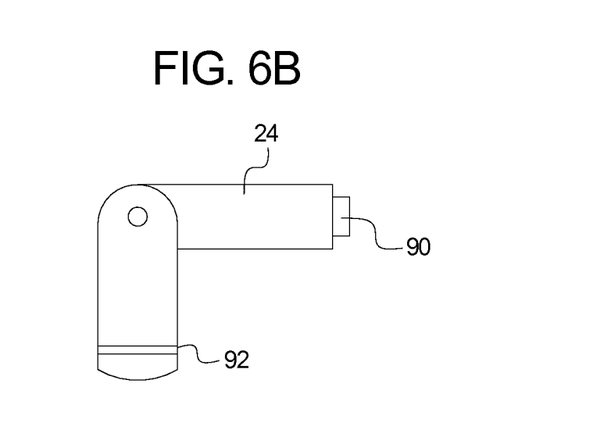
FIG. 6b is a perspective view of another electric power adaptor from the system shown in FIG. 1.

FIGS. 6a and 6b illustrate embodiments of the wireless electric power adaptors 24 described herein. The wireless electric power adaptors 24 may be plugged into or otherwise physically connected to each portable electronic device 22 to facilitate the delivery of electric power to portable electronic devices 22 from the platform 10 without physical contact or physical connection by the portable electronic devices 22 to any link 16 or other element of the platform 10.

In one example, the wireless electric power adaptor 24 includes one or more adaptors 90 that physically plug into, or otherwise physically connect to, the respective electric power port of a portable electronic device 22. The wireless electric power adaptor 24 facilitates delivery of electric power to portable electronic devices 22 without physical contact or physical connection by such portable electronic device 22 to any link 16 or any other element of the platform 10. In a preferred embodiment, the wireless electric power adaptor 24 has an LED indicator 92 that displays, for example, connection status, among other information.

While described as discreet components, it is understood that in certain embodiments of the system 100, the wireless audiovisual adaptors 20 and wireless electric power adapters 24 may be integrated within a single component.

It is contemplated that the elements of the system 100 may be optimally provided in various forms and configurations to best meet the particular circumstance of use. For example, it is contemplated that the solution provided herein may be particularly well adapted to support the demands of the various environments required to support military, homeland security, and police functions. In such cases, providing a ruggedized, moisture resistant, hermetically sealed, vibration resistant, and thermally resistant platform may be particularly beneficial.

As noted above, the system 100 facilitates the delivery of services to the portable electronic devices 22 without physical contact or physical connection by such device 22 to any link or other element of the platform 10. The system 100 manages and facilitates the following general functions: (i) the connection (and disconnection) of electronic portable devices 22 on to and off of the platform 10; (ii) the delivery of electric power to electronic portable devices 22 and management thereof; and (iii) the facilitation of audiovisual supply signals from the electronic portable devices 22 to the platform 10, all without physical contact or physical connection by any electronic portable devices 22 to any link 16 or to any other element of the platform 10. Additionally, the system 10 facilitates the delivery of Internet connectivity to the electronic portable devices 22 within proximate range of the platform 10 by means of a standard wireless Internet router 48 in the master control unit 12.

The system 100, controlled by the master control unit 12, manages the wire-free connection (and disconnection) of portable electronic devices 22 on to and off of the platform 10. The master control unit 12 detects when unconnected portable electronic devices 22 enter range of a supported link 16 and when portable electronic devices 22 connect and/or disconnect from a supported link 16. In preferred embodiments, the master control unit 12 regularly calculates the number of portable electronic devices 22 wirelessly connected to the system 10 through the links 16 and may further govern the maximum number of portable electronic devices 22 permitted to connect to the platform 10 through the links 16 at any given time. The master control unit 12, by means of software, also controls which specific link 16 a given portable electronic device 22 may connect to when the portable electronic device 22 is in proximate range of, and is capable of connecting to, more than one link 16.

The system 100, controlled by the master control unit 12, facilitates the delivery of electric power through the master control unit 12 to the links 16, and thereafter such links 16 distribute electric power to connected portable electronic devices 22 within proximate range of the links 16. The system 100 automatically manages the supply of electric power to ensure that the supply of electric power is sufficient to power the connected portable electronic devices 22. The system 100 may automatically enable and/or disable a connected wireless electric power adaptor 24 and/or link 16, through the master control unit 12, in response to electric power demands of the system 100 and portable electronic devices 22 connected thereto.

The system 100, controlled by the master control unit 12, facilitates the delivery of multiple sources of audiovisual signals to an audiovisual display device from portable electronic devices 22 wirelessly connected to the platform 10 through the links 16. In a preferred embodiment, the master control unit 12 automatically detects when an audiovisual display device is connected to the system 10. The master control unit 12 automatically determines which electronic personal devices 22 connected to the platform 10 through the link(s) 16 are able to transmit audiovisual supply signals to the audiovisual display device and, consequently, which electronic personal device 22 is currently the active source of such audiovisual supply signals. The platform 10 receives requests from connected electronic personal devices 22 to assume control (and terminate control) of the audiovisual display device. The system 100 manages and permits such requesting electronic personal device 22 to assume such control of the audiovisual display device and other portable electronic devices 22 to request the same control.

As shown in FIG. 2d, the master control unit 12 may include a controller 44 and associated memory 46. The controller 44 runs a variety of application programs, accesses and stores data, and controls various elements of the system 100. While further description of the controller 44 is provided below, it is understood that the controller 44 may be embodied in any one or more electronic systems arranged to control the electronic aspects of the system 100 described herein.

As shown by the above discussion, a controller 44 controls aspects of the system 100. Typically, one or more programmable data processing devices are used to implement the functions of the controller 44. The hardware elements, operating systems and programming languages of such devices are conventional in nature, and it is presumed that those skilled in the art are adequately familiar therewith.

For example, the controller 44 may be a central control processing system utilizing a central processing unit (CPU), memories and an interconnect bus. The CPU may contain a single microprocessor, or it may contain a plurality of microprocessors for configuring the CPU as a multi-processor system. The memory 46 may include a main memory, such as a dynamic random access memory (DRAM) and cache, as well as a read only memory, such as a PROM, an EPROM, a FLASH-EPROM, or the like. The system also includes mass storage devices when appropriate. In operation, the main memory stores at least portions of instructions for execution by the CPU and data for processing in accordance with the executed instructions.

Those skilled in the art will recognize that the controller 44 also encompasses systems such as host computers, servers, workstations, network terminals, and the like. In fact, the use of the term controller 44 is intended to represent a broad category of components that are well known in the art, though the preferred embodiment is as a component of the master control unit 12 described herein with reference to the FIGS.

Hence aspects of the system 100 discussed herein encompass hardware and software for controlling the relevant functions. Software may take the form of code or executable instructions for causing a controller 44 or other programmable equipment to perform the relevant steps, where the code or instructions are carried by or otherwise embodied in a medium readable by the controller 44 or other machine. Instructions or code for implementing such operations may be in the form of computer instruction in any form (e.g., source code, object code, interpreted code, etc.) stored in or carried by any readable medium.

As used herein, terms such as computer or machine "readable medium" refer to any non-volatile medium that participates in providing instructions to a processor for execution. Such a medium may take many forms, including tangible storage media. Non-volatile storage media include, for example, optical or magnetic disks, such as any of the storage devices in any computer(s) shown in the drawings. Common forms of computer-readable media therefore include for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM and EPROM, a FLASH-EPROM, any other memory chip or cartridge, etc. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A system for delivering wireless power and associated services to portable electronic devices comprising:
   a plurality of links, each link including one or more transmitters adapted to wirelessly transmit electric power and one or more transmitters/receivers adapted to wirelessly transmit and receive audio-visual data and associated control data, wherein the plurality of links are adapted to interconnect in series such that electric power and audio-visual data and associated control data are transmitted between connected links;
   a master control unit including a controller adapted to control the delivery of electric power through the interconnected links and control the delivery of selected audio-visual data from the links to a central audio-visual adaptor;
   one or more wireless audio-visual adaptors, each wireless audio-visual adaptor including an adaptor for connecting to an audio-visual port of a portable electronic device and a transmitter/receiver adapted to wirelessly transmit audio-visual data and associated control data to the links; and
   one or more wireless power adaptors each wireless power adaptor including an adaptor for connecting to a power input port of a portable electronic device and a receiver adapted to wirelessly receive power;
   wherein the master control unit selectively controls delivery of one or more audio-visual signals between the portable electronic devices connected to the plurality of links and between each portable electronic device and an audio-visual display device.

2. The system of claim 1 wherein the system may be expanded or contracted by adding or removing links to or from the system.

3. The system of claim 1 wherein the master control unit controls the expansion and contraction of the system by automatically coordinating the addition and subtraction of portable electronic devices to or from the system in real-time.

4. The system of claim 1 wherein the master control unit further includes a wireless Internet router.

5. The system of claim 1 wherein the master control unit includes a standard 8P8C port and a serial bus port.

6. The system of claim 1 wherein the master control unit includes a display providing real-time information regarding the connection of portable electronic devices to the master control unit.

7. The system of claim 1 wherein the master control unit connects to the links through a cable terminal.

8. The system of claim 7 wherein the cable terminal includes the central audiovisual adaptor.

9. The system of claim 7 wherein the cable terminal includes at least two wired connectors for connecting the plurality of links to the master control unit.

10. The system of claim 1 wherein the links are configured to be interconnected in at least two different orientations.

11. The system of claim 10 wherein the connection between two interconnected links pivots through a range of orientations.

12. The system of claim 10 wherein the connection between two interconnected links may be made at a plurality of locations on the link.

13. The system of claim 1 wherein the wireless audio-visual adaptors include a button to initiate and release control of audio-visual data communication to the central audio-visual adaptor.

14. The system of claim 1 wherein the wireless audio-visual adaptors include a connection status display comprising an LED.

15. The system of claim 1 wherein the wireless power adaptors include a connection status display comprising an LED.

16. A system for wirelessly delivering power to a plurality of portable electronic devices and controlling the delivery of audio-visual data to a central audio-visual adaptor comprising:
 a master control unit that provides power to a series of interconnected links that transmit power wirelessly to associated wireless power adaptors associated with portable electronic devices and wirelessly control the transmission of audio-visual data to the central audio-visual adaptor from one of the portable electronic devices through wireless audio-visual adaptors;
 wherein the master control unit selectively controls delivery of one or more audio-visual signals between the portable electronic devices connected to the plurality of links and between each portable electronic device and an audio-visual display device connected to the central audio-visual adaptor.

17. The system of claim 16 wherein the series of interconnected links is automatically expandable by connecting additional one or more additional links to the series of interconnected links.

18. The system of claim 17 wherein one or more additional portable electronic devices are automatically connected to the master control unit in real-time.

19. The system of claim 18 wherein the master control unit further includes a wireless Internet router.

20. A system for wirelessly delivering power to a plurality of portable electronic devices and controlling the delivery of audio-visual data to a central audio-visual adaptor comprising:
 means for providing power to an expandable series of interconnected links that transmit power wirelessly to associated wireless power adaptors associated with portable electronic devices and wirelessly control the transmission of audio-visual data to the central audio-visual adaptor from one of the portable electronic devices through wireless audio-visual adaptors;
 wherein the master control unit selectively controls delivery of one or more audio-visual signals between the portable electronic devices connected to the plurality of links and between each portable electronic device and an audio-visual display device connected to the central audio-visual adaptor.

* * * * *